US012762304B2

(12) United States Patent
Costa Da Silva

(10) Patent No.: US 12,762,304 B2
(45) Date of Patent: Oct. 13, 2026

(54) METHODOLOGY FOR HPHISO QUALITY MAP FILTERED BY TRANSMISSIBILITY AND SCAN QUALITY FOR POST-PROCESSING OF OIL RESERVOIR FLOW SIMULATIONS

(71) Applicant: Petróleo Brasileiro S.A.—Petrobras, Rio de Janeiro (BR)

(72) Inventor: Victor Costa Da Silva, Niterói (BR)

(73) Assignee: Petróleo Brasileiro S.A.—Petrobras, Rio de Janeiro (BR)

( * ) Notice: Subject to any disclaimer, the term of this patent is extended or adjusted under 35 U.S.C. 154(b) by 1055 days.

(21) Appl. No.: 17/782,076

(22) PCT Filed: Nov. 24, 2020

(86) PCT No.: PCT/BR2020/050498
§ 371 (c)(1),
(2) Date: Jun. 2, 2022

(87) PCT Pub. No.: WO2021/108877
PCT Pub. Date: Jun. 10, 2021

(65) Prior Publication Data

US 2023/0028727 A1 Jan. 26, 2023

(30) Foreign Application Priority Data

Dec. 2, 2019 (BR) .......................... 1020190254998

(51) Int. Cl.
*G06F 30/20* (2020.01)
*G06F 111/10* (2020.01)

(52) U.S. Cl.
CPC .......... *G06F 30/20* (2020.01); *G06F 2111/10* (2020.01)

(58) Field of Classification Search
CPC ...... G06F 30/20; G06F 2111/10; G06F 30/25; G06F 30/27; G06F 30/28; E21B 43/00; E21B 2200/20; E21B 43/30
See application file for complete search history.

(56) References Cited

U.S. PATENT DOCUMENTS 9,058,445 B2 6/2015 Usadi et al.
9,068,448 B2 * 6/2015 Hui ......................... G06F 30/23
(Continued)

FOREIGN PATENT DOCUMENTS

CN 104453834 A 3/2015
CN 104881522 A 9/2015
(Continued)

OTHER PUBLICATIONS

Melani, Leandro Hartleben, et al. "The Impact of Archie's Parameters in the Calculation of Water Saturation for Carbonate Reservoir, Campos Basin, Brazil." SEG International Exposition and Annual Meeting. SEG, 2015. (Year: 2015).*
(Continued)

*Primary Examiner* — Saif A Alhija
(74) *Attorney, Agent, or Firm* — Arent Fox Schiff LLP

(57) ABSTRACT

The invention presents a methodology for evaluating the drainage efficiency of the proposed drainage mesh, by identifying poorly drained regions for mesh optimization and/or implementation of complementary projects, in addition to qualitatively evaluating the drainage effect of a field with different number of wells and units and, finally, comparatively evaluating the drainage quality from different reservoirs, thus observing opportunities for optimizing production management, such as activating different intelligent completion valves, for example. To achieve this objective, it applies a set of filters to the mobile HPHISO map in order to identify the regions that have the greatest potential to be
(Continued)

explored and that will bring greater recovery gains for a given oil field.

7 Claims, 11 Drawing Sheets

(56) References Cited

U.S. PATENT DOCUMENTS

| | | | | |
|---|---|---|---|---|
| 9,135,378 | B2 | 9/2015 | Le Ravalec | |
| 2008/0133186 | A1* | 6/2008 | Li | G06F 30/23 703/2 |
| 2016/0003010 | A1 | 1/2016 | Fornel et al. | |
| 2019/0228121 | A1* | 7/2019 | Fung | G06F 30/20 |

FOREIGN PATENT DOCUMENTS

| | | | |
|---|---|---|---|
| CN | 106894814 | A | 6/2017 |
| CN | 107025358 | A | 8/2017 |

OTHER PUBLICATIONS

Fanha, Ana Beatriz, Jose Sergio Cavalcante, and Yoe Alain Reyes-Perez. "Uncertainty Analysis of an Integrating Two Structural 3D Sthochastic Geological Models of a Siliciclastic Reservoir: Potiguar Basin, Northeast of Brazil." SPE Europec featured at EAGE Conference and Exhibition?. SPE, 2010. (Year: 2010).*

International Search Report, issued by International Searching Authority in corresponding International Application No. PCT/BR2020/050498, mailed Feb. 19, 2021.

International Preliminary Report on Patentability, issued by International Searching Authority in corresponding International Application No. PCT/BR2020/050498, mailed Oct. 29, 2021.

* cited by examiner

METHODOLOGY FOR HPHISO QUALITY MAP FILTERED BY TRANSMISSIBILITY AND SCAN QUALITY FOR POST-PROCESSING OF OIL RESERVOIR FLOW SIMULATIONS

CROSS-REFERENCE TO RELATED APPLICATIONS

This application is a National Stage entry of International Application No. PCT/BR2020/050498, filed on Nov. 24, 2020 which claims priority to Brazilian Patent Application No. BR 1020190254998, filed on Dec. 2, 2019. The disclosures of the priority applications are hereby incorporated in their entirety by reference.

FIELD OF THE INVENTION

The invention in question works as a disruptive view of the classic approach of the HPHISO map as a post-processing tool for reservoir simulations, aiming at a more explicit and efficient indication of poorly drained regions and with the potential for drainage mesh optimization. The classic approach is composed of the product of the thickness (H), porosity (PHI) and oil saturation (SO) quantities, which is widely used in the daily life of reservoir engineers, especially for positioning wells and defining meshes and drainage strategies for the fields. The critical analysis of the HPHISO (or mobile HPHISO) at the end of the period considered for production (end of the concession contract, period of validity of charter contracts, economic cuts, or others) is also usually applied in external evaluation groups, with the objective of identifying poorly drained regions and evaluating the efficiency of the mesh and proposed strategy.

DESCRIPTION OF THE STATE OF THE ART

The critical analysis of the HPHISO (or mobile HPHISO) over time alone is not able to fully represent the drainage quality of a mesh and/or potential regions for complementary designs or mesh optimizations. This is because the undrained oil indicated in the model has three different origins:

1. When in regions of good porosity and thickness (and consequently good HPHISO), but with low transmissibility. Often such characteristics arise after adjustments in the flow model, which penalize the transmissibility of certain regions, despite not changing the porosity;
2. When still mobile, but in the region of the relative permeability curve where the increment of displacement efficiency per injected porous volume is very small. This type of characteristic usually appears in areas of the reservoir with a greater volume of oil in place (VOIP), and that, even after circulating large injected volumes, the ROS (remaining oil saturation) limit has not yet been reached. In these cases, it is common to observe high recovery factors, despite the large volume indicated in the HPHISO map over a long period of time;
3. When in regions of good transmissibility, but poorly drained due to inefficiency of the mesh or of the exploitation method. Regions identified with these characteristics should be the target of any critical analysis of drainage quality and identification of opportunities for mesh optimization.

Document CN104453834A discloses a method for optimizing the relationship between injection and production in a drainage mesh, using objective-specific geological modeling tools and optimization and maximization tools.

Unlike document CN104453834A, the proposal here was not developed as a modeling methodology with optimization, but as a post-processing methodology for reservoir flow simulations, allowing the user to identify regions of the field in question that have not been adequately scanned by the drainage mesh to which the field has been subjected.

BRIEF DESCRIPTION OF THE INVENTION

The invention presents a methodology for evaluating the drainage efficiency of the proposed drainage mesh, identifying poorly drained regions that are candidates for the implementation of complementary projects or that are the target of optimizations in the drainage meshes. In addition, the invention makes it possible to qualitatively evaluate the drainage effect of a field with different number of wells and units and, finally, to comparatively evaluate the drainage quality of different reservoirs, thus observing opportunities for optimizing production management, such as the activation of different valves of intelligent completion, change of injection allocation strategies, among others.

BRIEF DESCRIPTION OF DRAWINGS

The present invention will be described in more detail below, with reference to the attached figures which, in a schematic way and not limiting the inventive scope, represent examples of its embodiment. From FIGS. 1 to 12, there is the workflow of the proposed methodology, as shown below.

Figure 13:
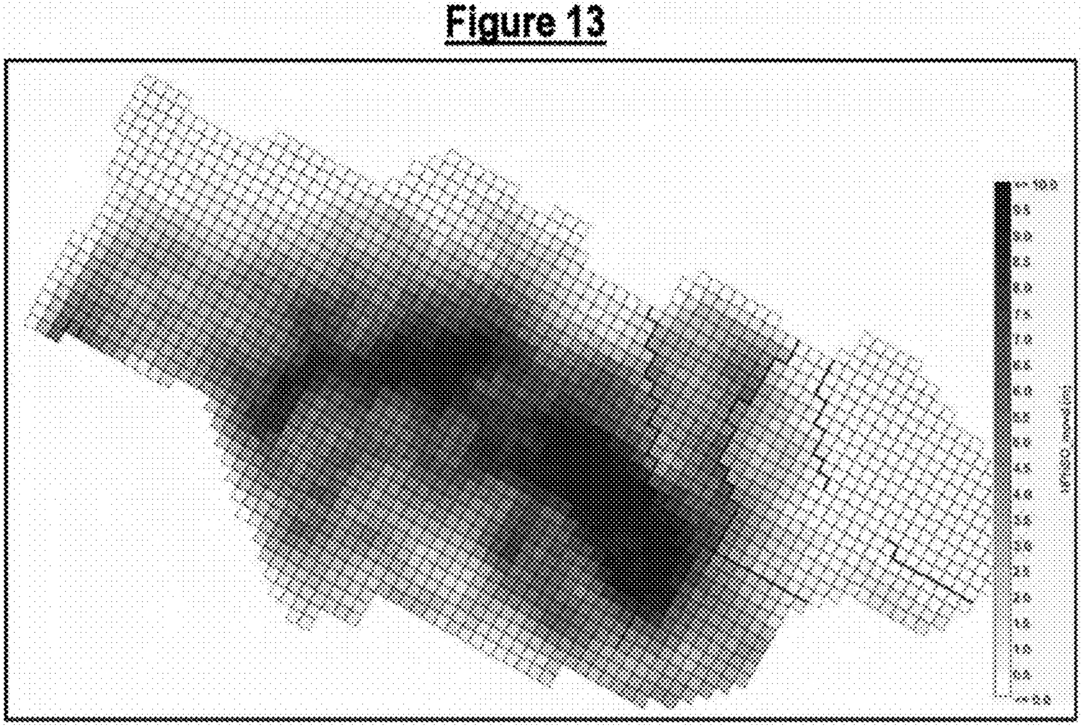

From FIG. 13 onwards, the application scenarios of the proposed methodology are presented against the traditional approach to present the value that the same can add.

FIG. 13 illustrates the mobile HPHISO map before the start of production in the Pituba synthetic field.

Figure 14:
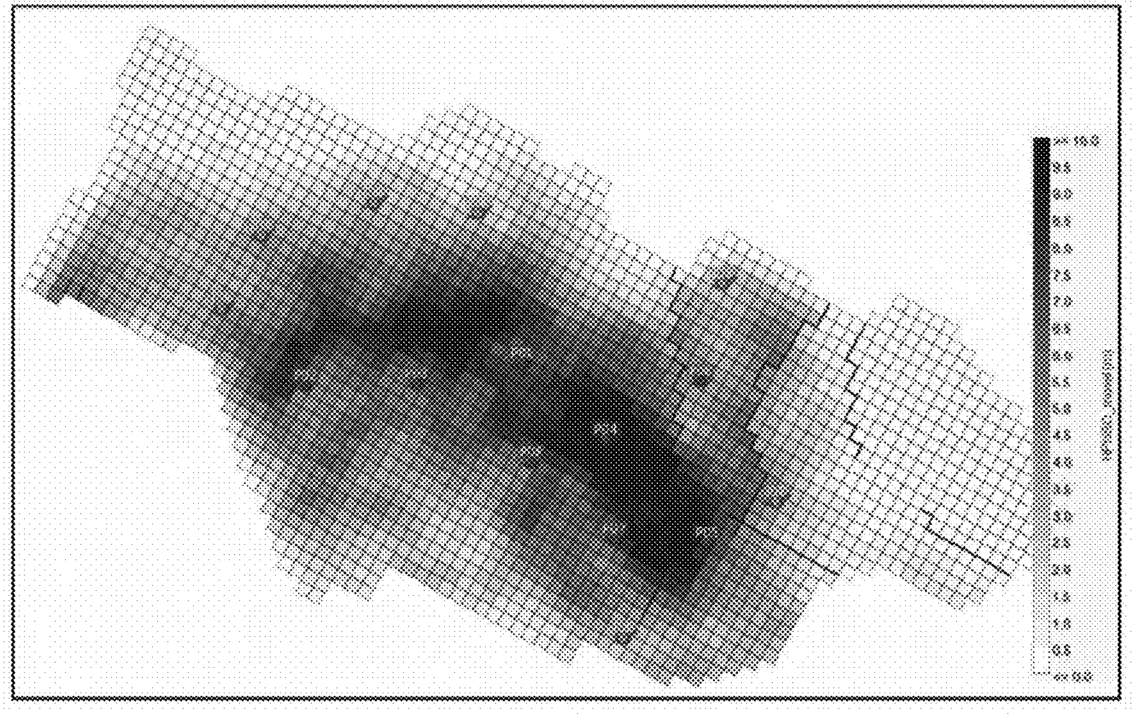

FIG. 14 illustrates the drainage mesh over a mobile HPHISO map of FIG. 13.

Figure 15:
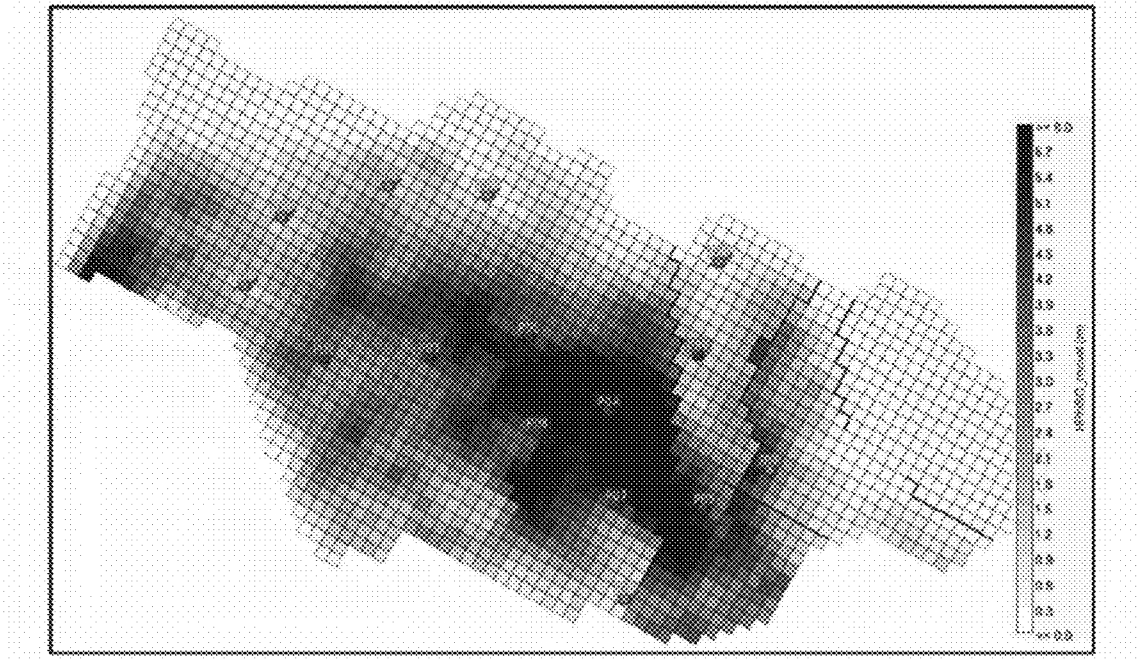

FIG. 15 illustrates the drainage mesh on a mobile HPHISO map after 27 years of field production from the drainage mesh of FIG. 14.

Figure 16:
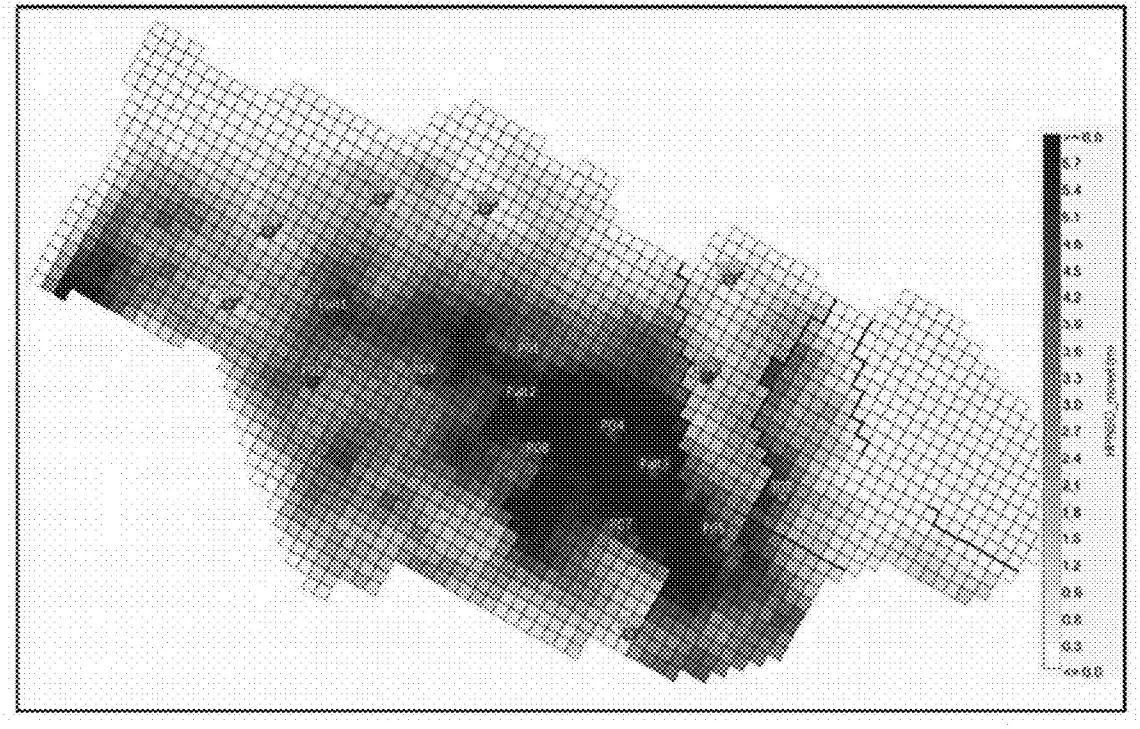

FIG. 16 illustrates the drainage mesh with the addition of 3 mesh weighting wells positioned in the best locations according to the traditional HPHISO methodology—Palt1, Palt2 and Palt3.

Figure 17:
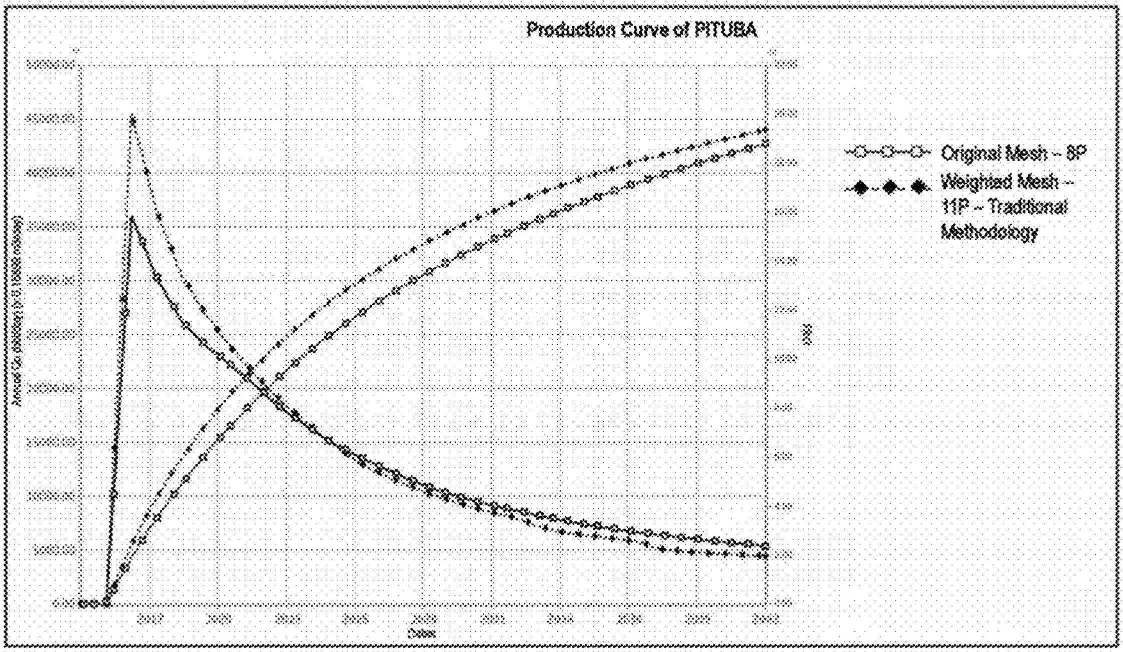

FIG. 17 illustrates the gain in production curve and FR due to the addition of the 3 weighting wells according to the traditional methodology (FIG. 16).

Figure 18:
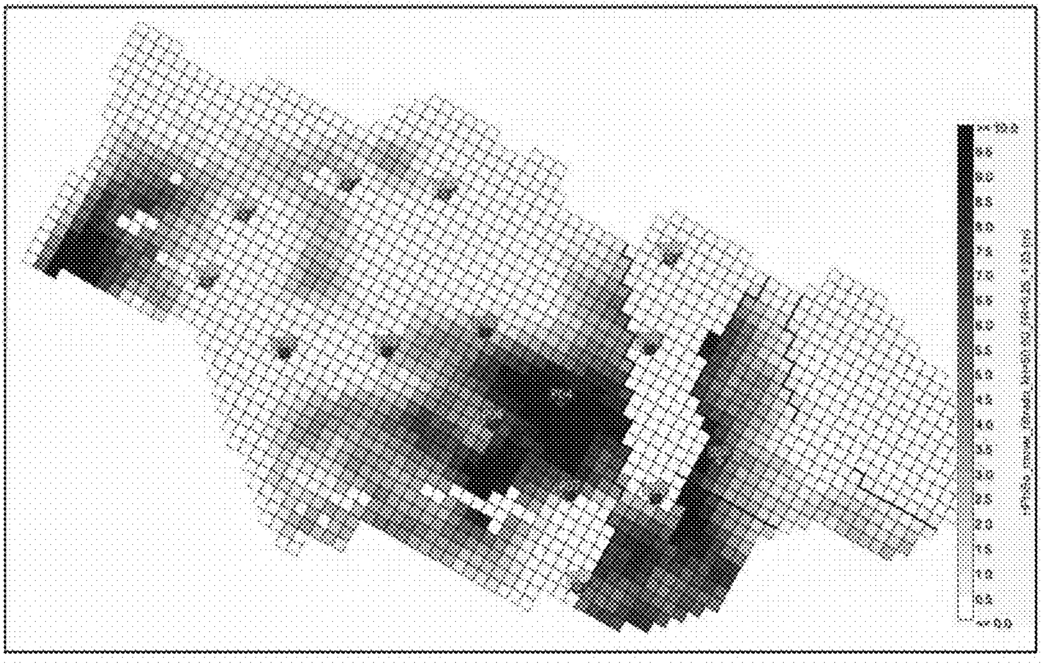

FIG. 18 illustrates the original drainage mesh over the mobile HPHISO map filtered after 27 years of production.

Figure 19:
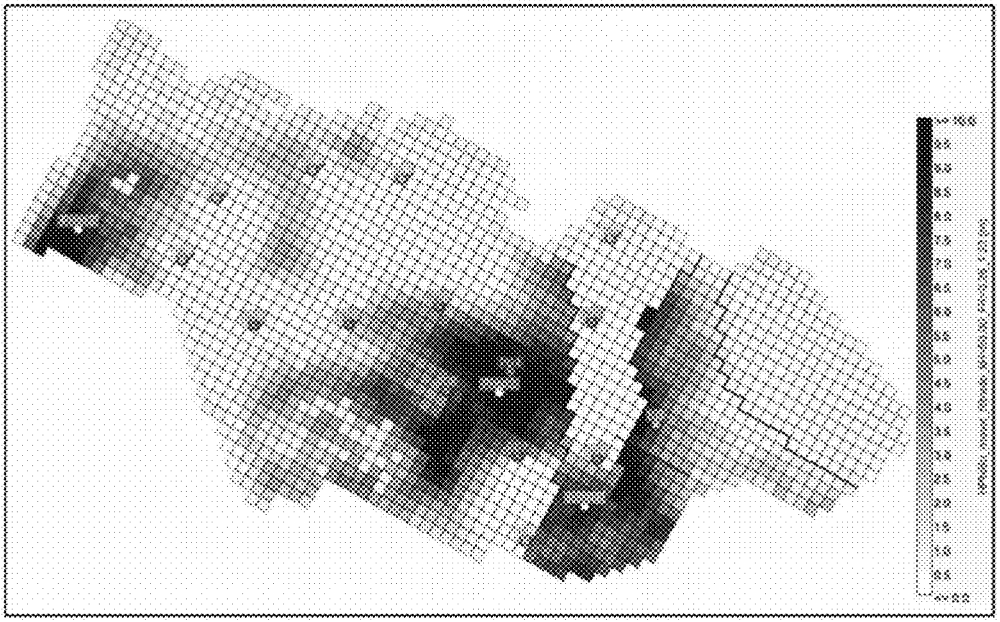

FIG. 19 illustrates the drainage mesh with the addition of 3 mesh weighting wells positioned in the best locations according to the methodology proposed by this invention—Ptest1, Ptest2 and Ptest3.

Figure 20:
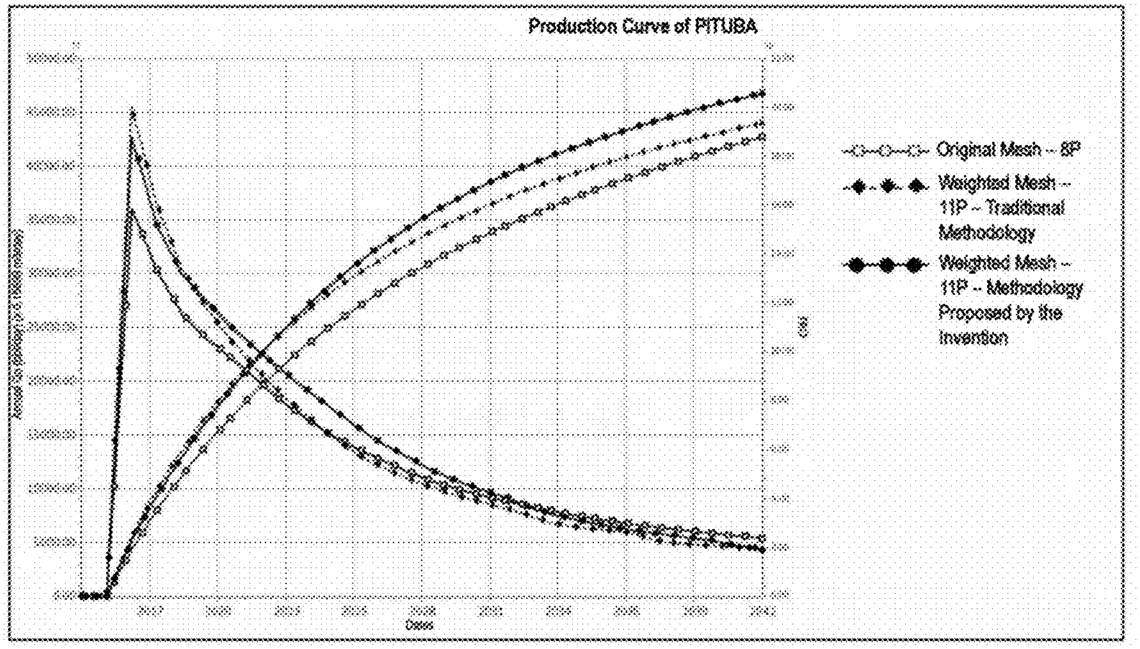

FIG. 20 illustrates the production curve gain and FR due to the addition of the 3 weighting wells according to the proposed methodology (FIG. 19) against the original mesh and the mesh of FIG. 16.

Figure 21:
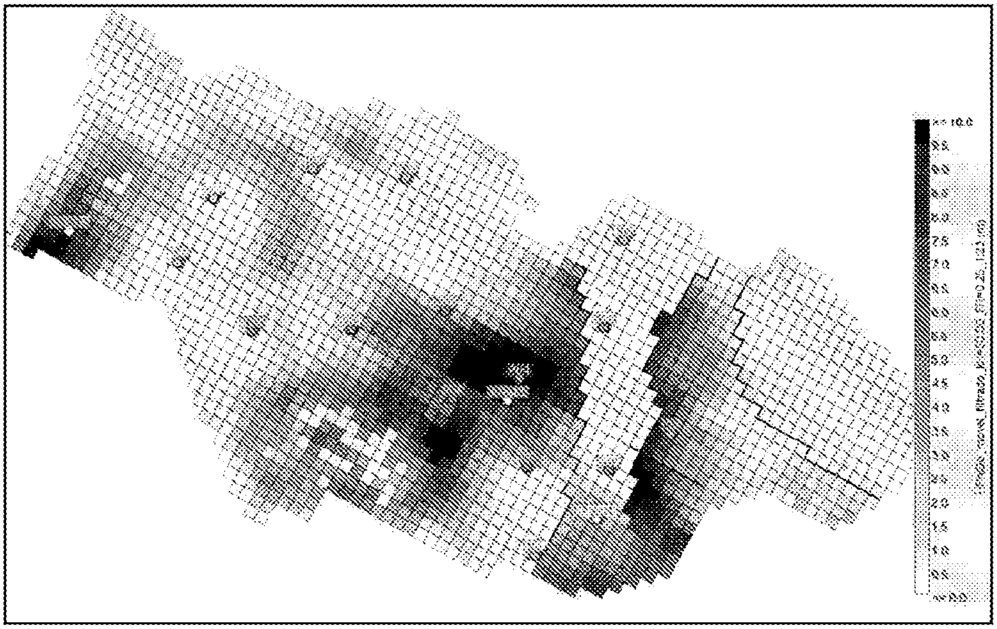

FIG. 21 illustrates the map of mobile HPHISO filtered from the weighted mesh of FIG. 19 after 27 years of production, indicating that there are still poorly drained areas that could be future weighting opportunities.

Figure 22:
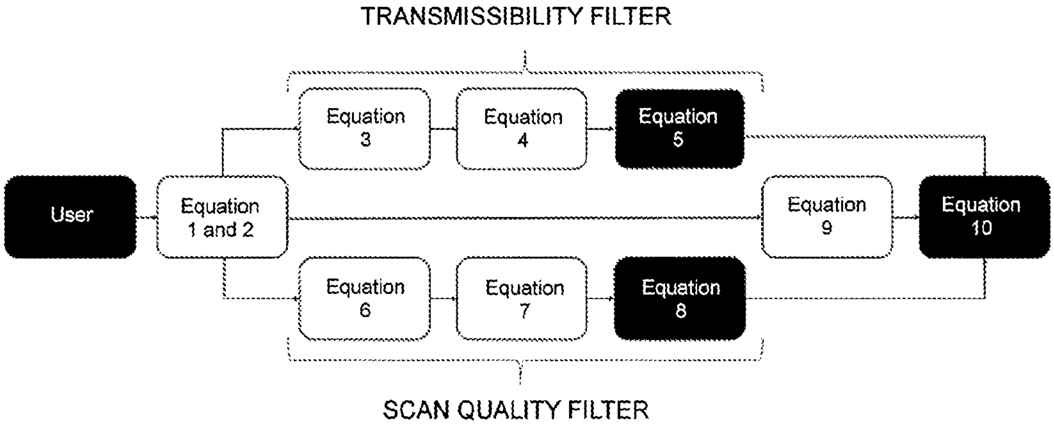

FIG. 22 illustrates the entire flow of activities of the proposed methodology.

DETAILED DESCRIPTION OF THE INVENTION

The main inventive character of the methodology in question is to bring the concept of adding filters over the traditional HPHISO map in order to purge regions that appear to have a high volume of residual oil and/or areas present that high porosities, but low permeabilities, reducing the drainage capacity of the same. The invented filters were reservoir transmissibility filters and scan quality filters. Such filters will work by reducing the weight of regions of remaining oil identified as origin 1 and 2, highlighting more the regions of origin 3. This invention can be applied to any type of reservoir, whether carbonate or siliciclastic reservoirs.

The transmissibility filter was proposed to de-characterize the remaining oil in 2 scenarios that can arise for any field that is being worked: (i) naturally porous reservoirs, but with a low permeability level, making the drainage of this region very impaired, and (ii) regions of the reservoir that are considered porous whose permeability is penalized during the historical adjustment process.

So, the filter is applied in a simple way, defining that if the transmissibility of the cell, given by equation (3), is lower than a given limit (defined by the user), all the oil is zeroed for the filtered HPHISO map.

Figure 1:
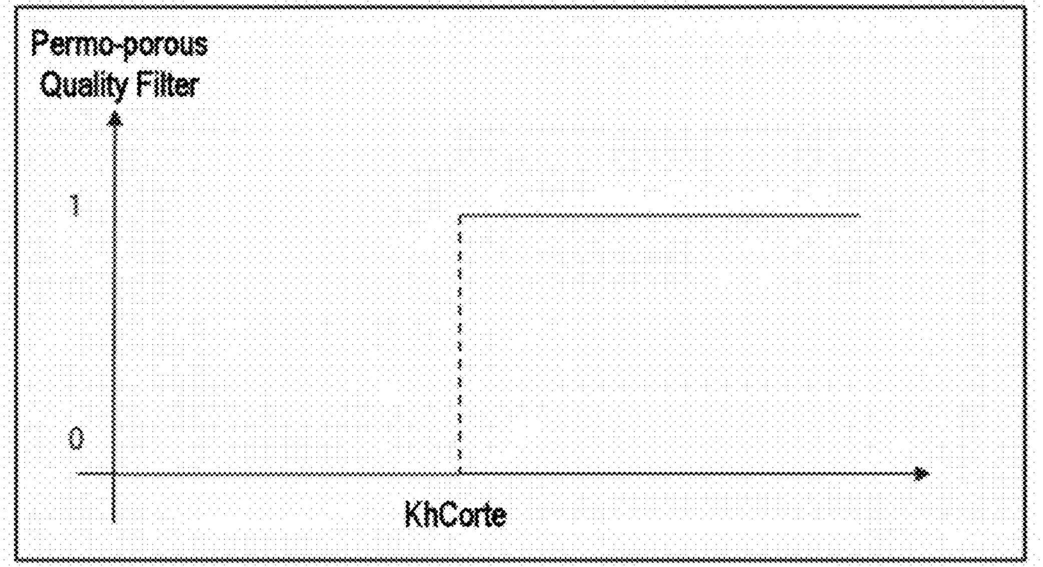
FIG. 1 illustrates the permo-porous quality filter (transmissibility).

The filter is applied to each grid cell and, later, the same is integrated in the depth, generating an average value along the reservoir defined by the user. Likewise, the user is also responsible for defining the value of kh such that there should be no fluid flow, FIG. 1.

The scan quality filter has the purpose of penalizing those regions that present a level of oil recovery above a certain cut, to be defined by the user. This filter is necessary because the microscopic recovery factor profile against the fractional flow of water has an asymptotic profile, so that from a certain level of recovery flow FR, the marginal growth of the same in relation to the injected volumes is very small, that is, to increase the FR between the critical value and the theoretical maximum FR, it would be necessary to inject an unfeasible number of porous volumes. When reaching the critical FR, there should be a minimum economic oil saturation, but higher than the remaining oil saturation.

Figure 2:
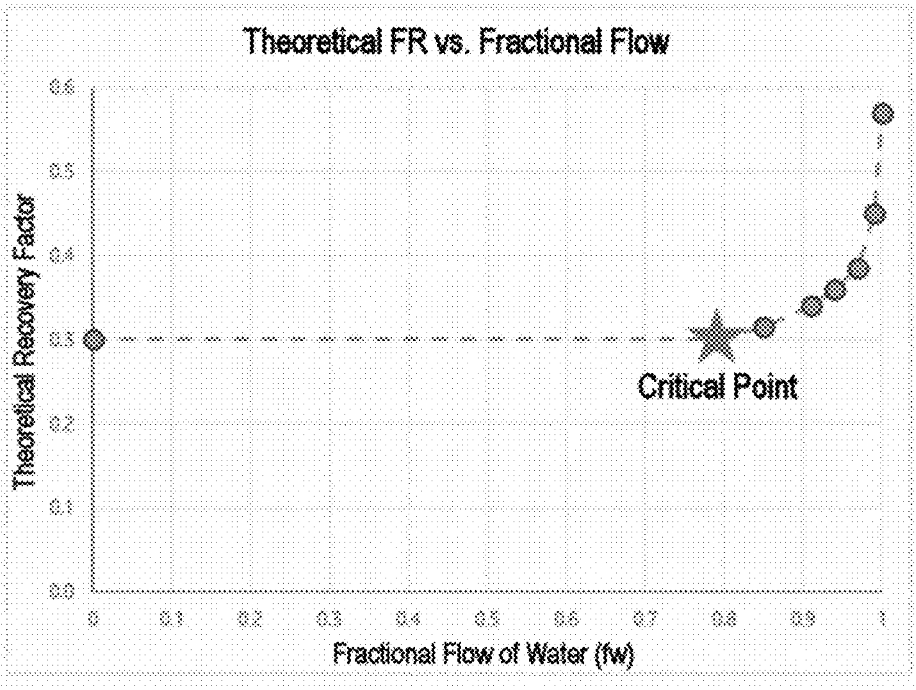
FIG. 2 illustrates the theoretical FR vs. fractional flow, identifying economic mobile oil saturation.

As a comparative basis with the Pituba field, the graph in FIG. 2 indicates the evolution of the theoretical recovery flow (FRt) with the fractional flow of water (fw). Note that, while fw is less than 80%, FRt is constant and equal to 30%. From that point on (considered fw at breakthrough), the FRt grows slowly (negative second derivative), until reaching FRt=57%, when the fw reaches 100%. This point is considered the maximum FRt. That is, from the critical point on, more and more water is produced for each unit of oil produced, which would significantly reduce the potential for increased recovery by increasing the drainage rate in that region.

Figure 3:
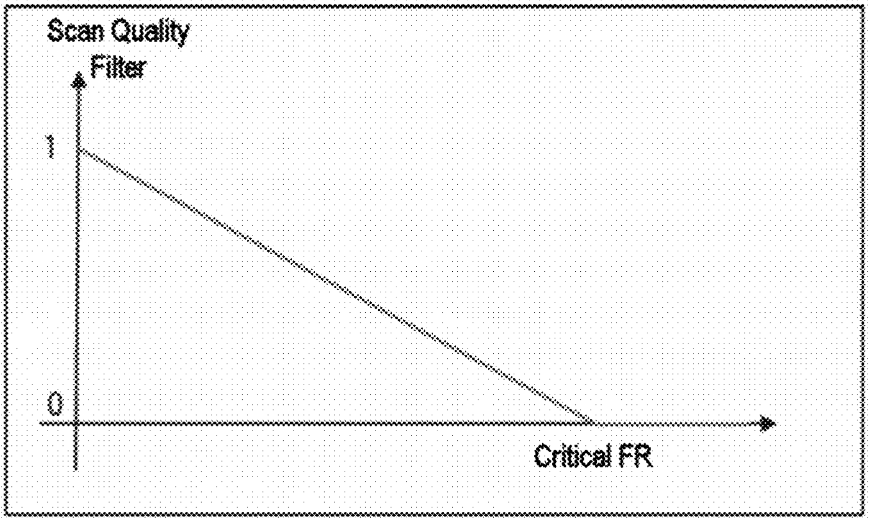
FIG. 3 illustrates the scan quality filter.
Figure 4:
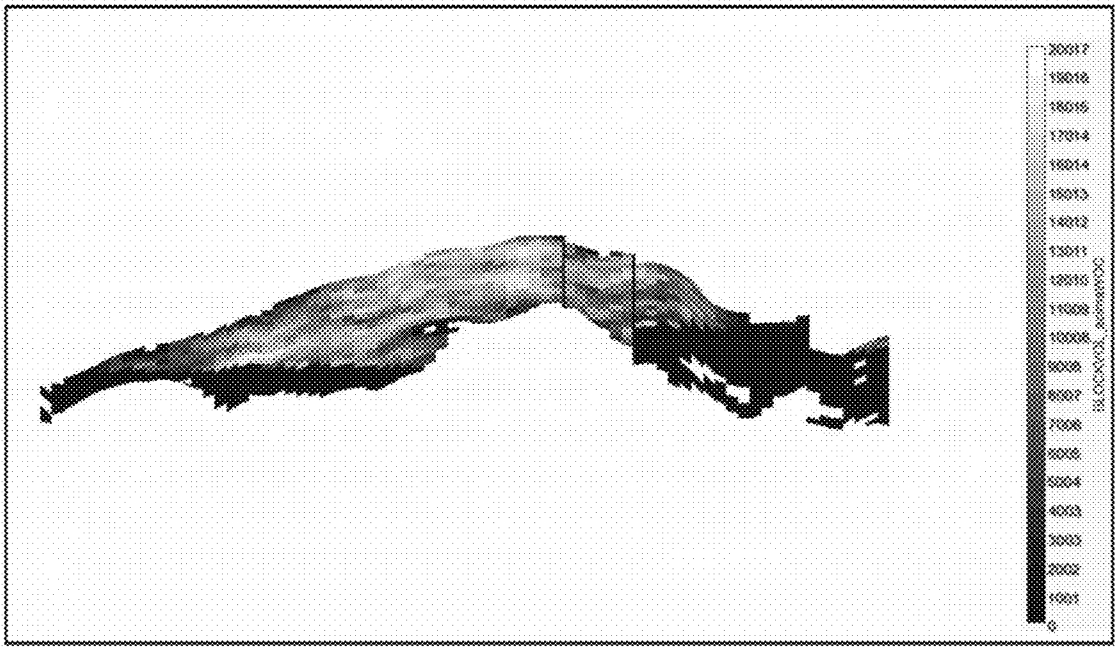
FIG. 4 illustrates the porous volume map above the COA.
Figure 5:
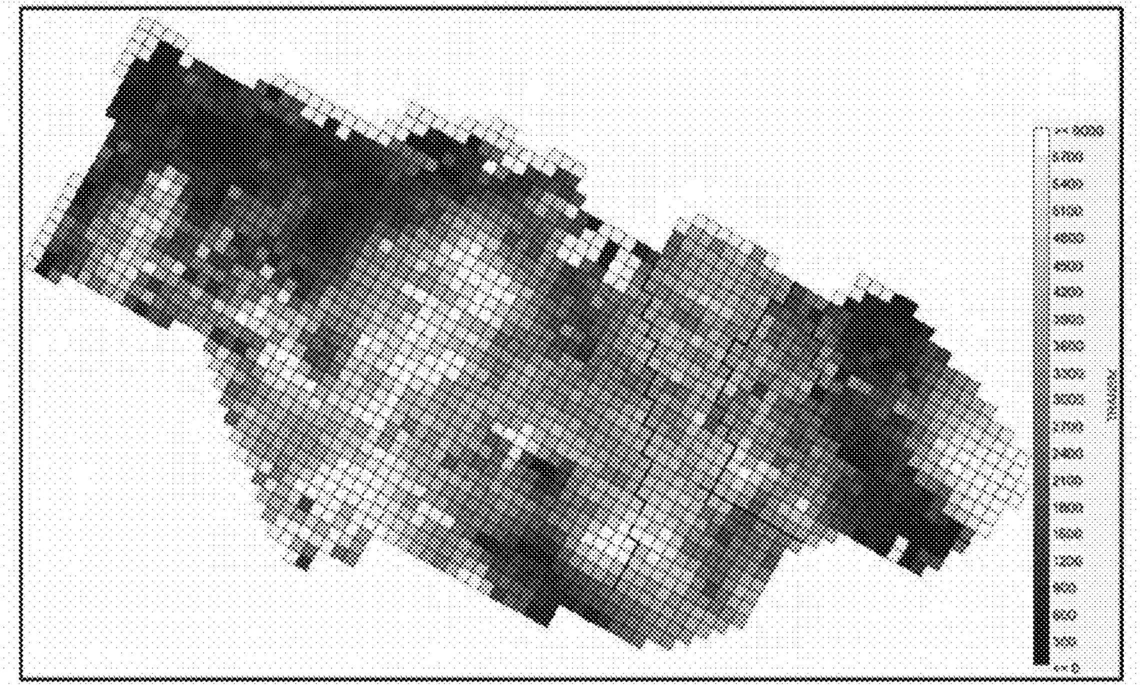
FIG. 5 illustrates the transmissibility map (equation 3).
Figure 6:
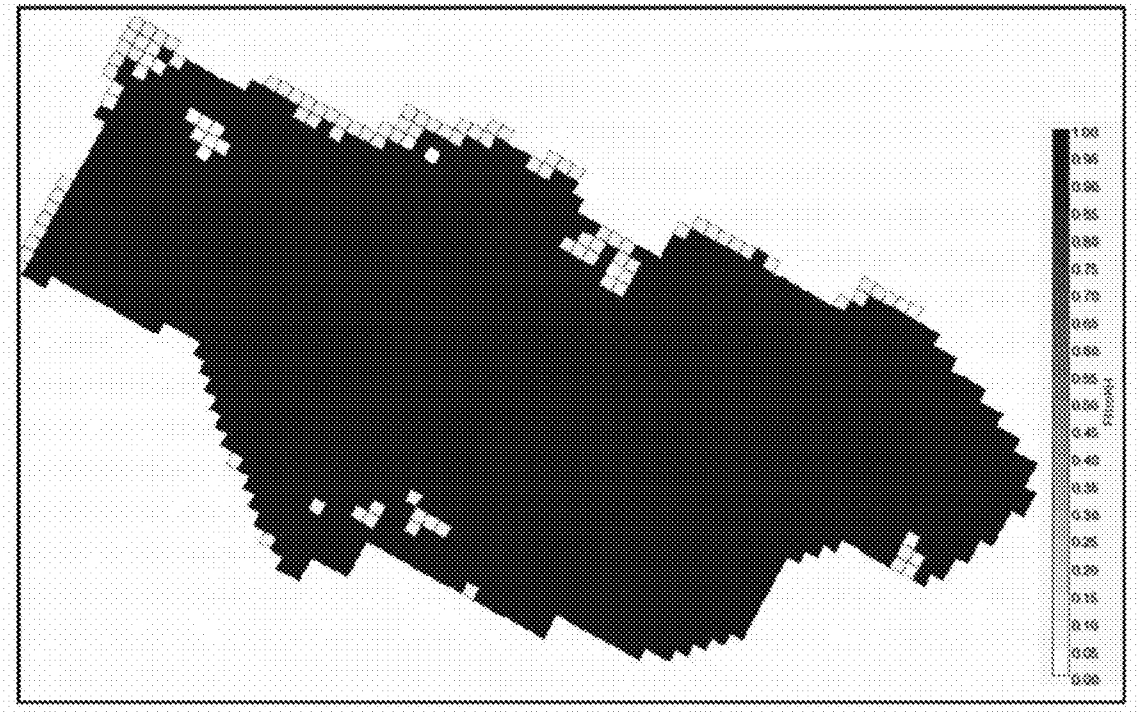
FIG. 6 illustrates the map of the applied transmissibility filter (filtroKH) (equation 4).
Figure 7:
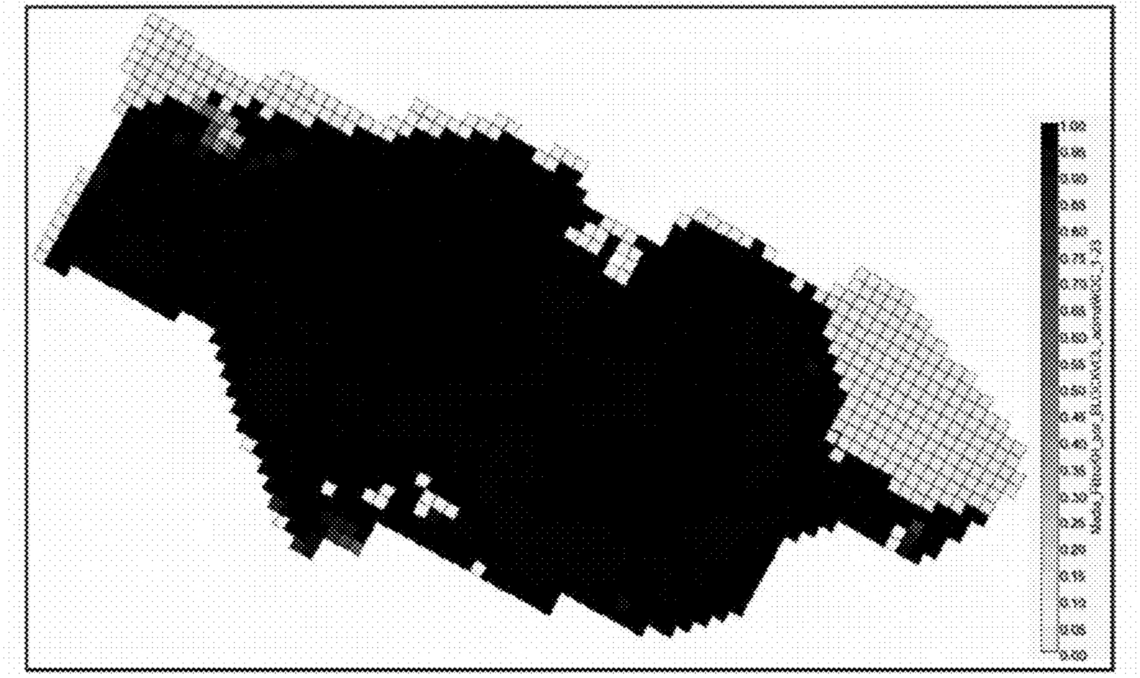
FIG. 7 illustrates the averaged map of the transmissibility filter (equation 5).
Figure 8:
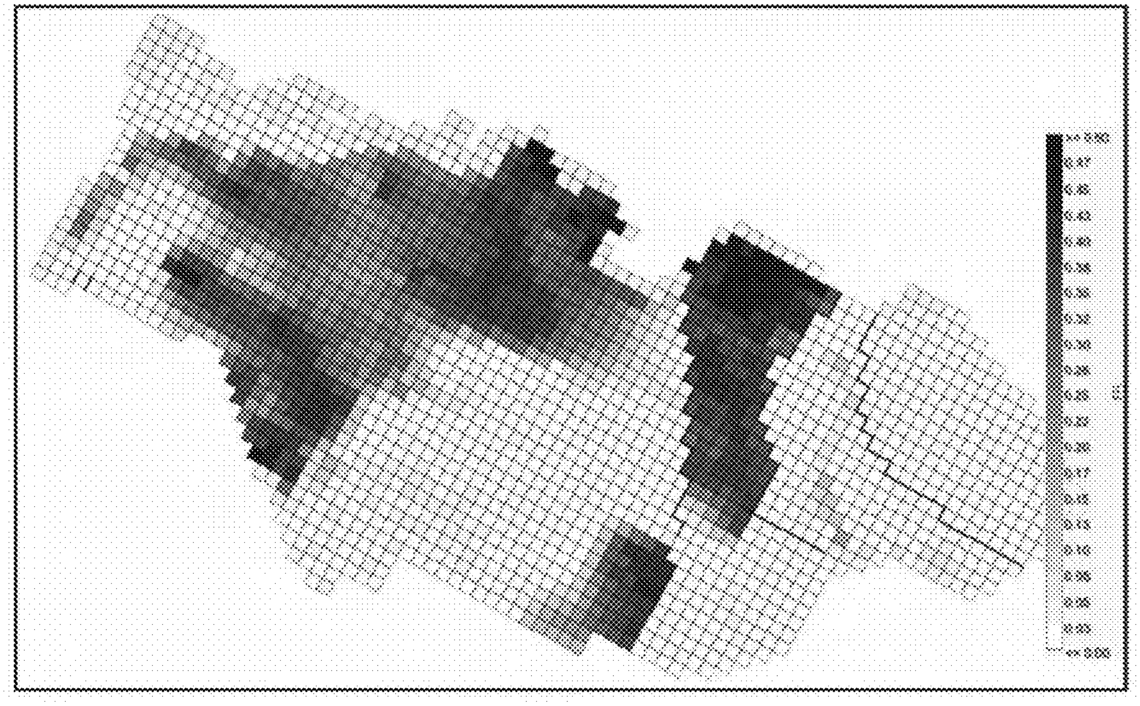
FIG. 8 illustrates the FR map per cell (equation 6).
Figure 9:
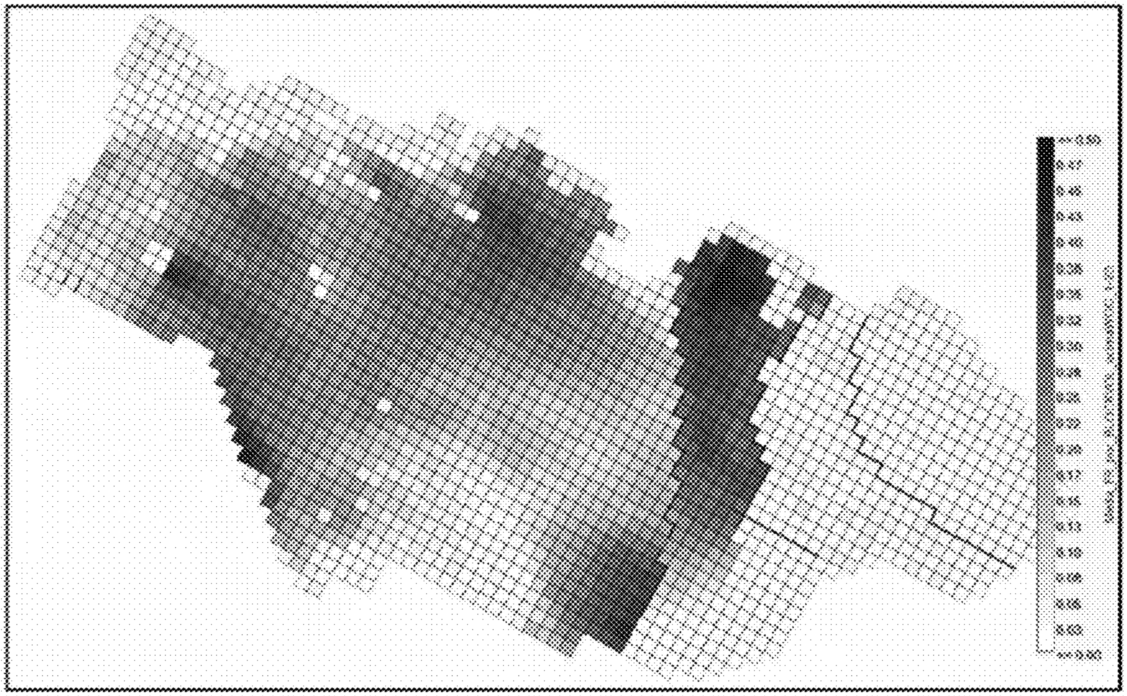
FIG. 9 illustrates the average FR map along column k (given by equation 7).
Figure 10:
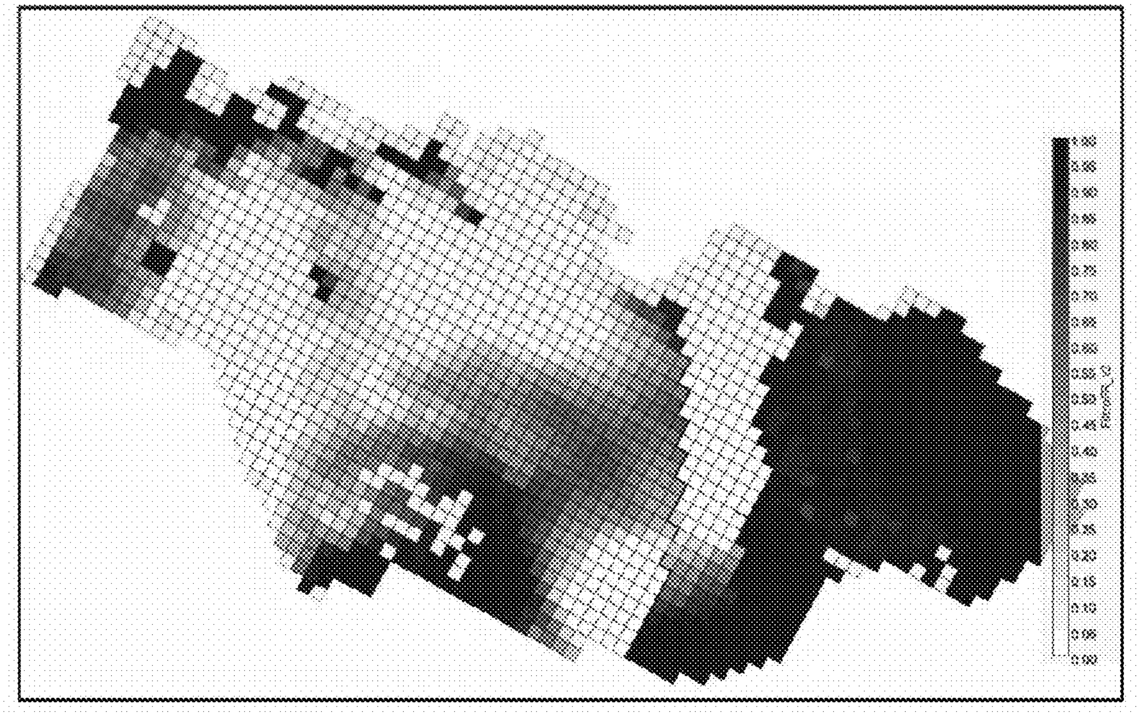
FIG. 10 illustrates the scan quality filter map (filtroFR) (equation 8).
Figure 11:
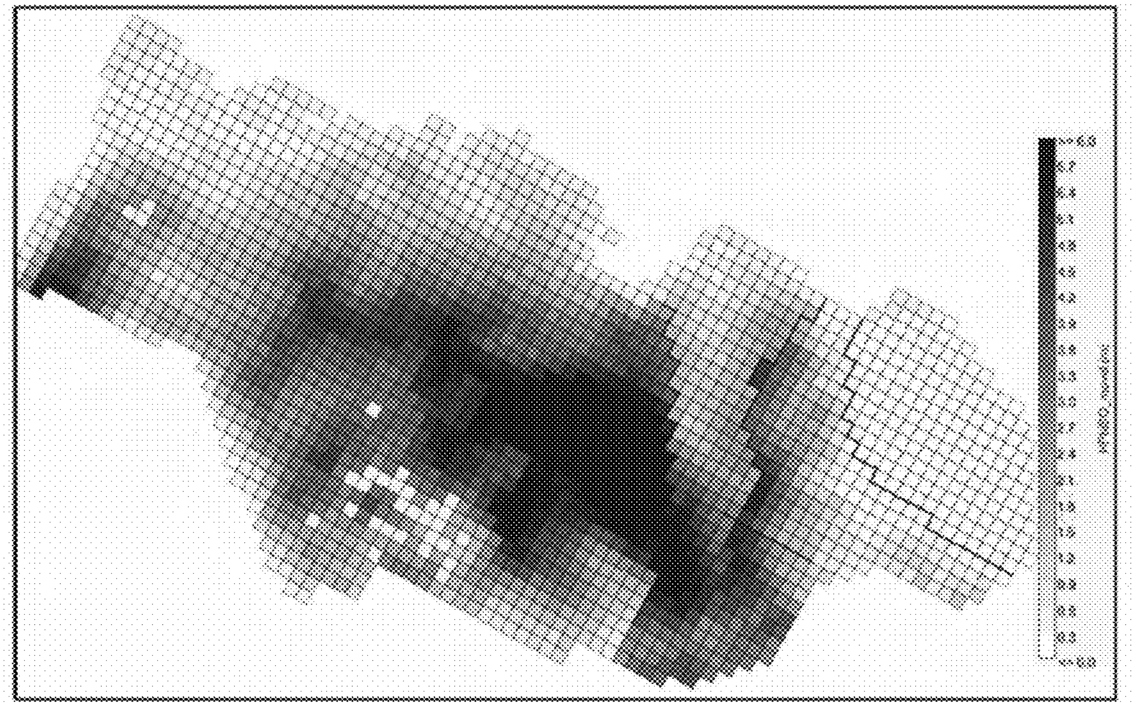
FIG. 11 illustrates the mobile HPHISO map (equation 9).
Figure 12:
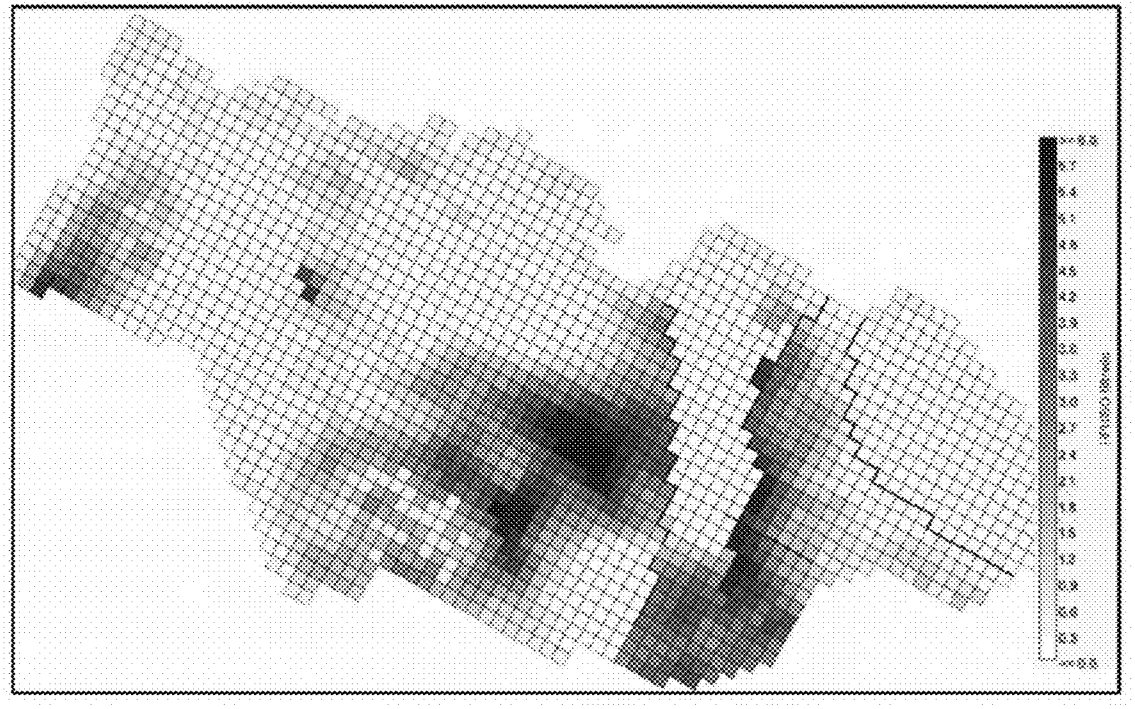
FIG. 12 illustrates the Filtered mobile HPHISO map, which is the final product of this invention (equation 10).

It will be up to the user to define the acceptable limit value for the theoretical cut-off recovery factor (FRt). Since in post-processing it is only possible to evaluate the absolute recovery factor (absolute FR) within this cut-off value, the scan efficiency will be considered. That is, if the scan efficiency is naturally low, the observed FR will also be, so that the filter will apply high values, as can be seen in the graph of FIG. 3. This factor will depend, among others, on the type of rock, mineralogy, model scale, reservoir wettability, etc.

The scan quality filter (or filtroFR) is calculated from the cell-by-cell FR estimate (equation 6). Since there is a significant variability in the FR by region of the reservoir, due to heterogeneities, the average of the FR along the column (equation 7) is applied to, finally, apply the filter, given by equation 8. It uses the FR limit as input. Note that it may be necessary to truncate the maximum and minimum values of the FR filter to 1.0 and 0.0, respectively.

The entire logical flow of the methodology being proposed is presented below. The same is consolidated in FIG. 22.

Four basic information will be provided for the methodology:

a. Transmissibility Cut (khCorte);

b. Recovery Cut (frCorte);

c. Top Layer of the Evaluated Reservoir (kTopo);

d. Evaluated Reservoir Base Layer (kBase).

Calculate and distribute in the field the porous volume property above the COA (BLOCKPVOL above the COA):

$$BVPacimaCOA_{ij} = \begin{cases} 0, & Sw_{ijk}(t_i) > 0{,}90 \\ BLOCKVOL_{ijk}, & SW_{ijk}(t_i) < 0{,}90 \end{cases} \quad (1)$$

$$BLOCKVOL_{ijk} = H_{ijk} * NTG_{ijk} * PHI_{ijk} \quad (2)$$

Calculate transmissibility in each model cell:

$$KH_{ijk} = H_{ijk} * \sqrt{\mathrm{PERMI}_{ijk} * \mathrm{PERMJ}_{ijk}} \quad (3)$$

Apply transmissibility filter in each model cell:

$$filtroKHcc_{ijk} = \begin{cases} 1, & KH_{ijk} > khCorte \\ 0, & KH_{ijk} < khCorte \end{cases} \quad (4)$$

Calculate weighted average of the transmissibility filter calculated by (4) by BVPacimaCOA between kBase and kTopo (along the k):

$$filtroKH_{ij} = \frac{\sum_k filtroKHcc_{ijk} * BVPacimaCOA_{ijk}}{\sum_k BVPacimaCOA_{ijk}} \quad (5)$$

Calculate FR cell-by-cell within the reservoir:

$$FRcc_{ijk} = \frac{So_{ijk}(ti) - So_{ijk}}{So_{ijk}(ti)} \tag{6}$$

Calculate the weighted average of the FRcc property by BVPacimaCOA between kBase and kTopo (along the k):

$$FRmedio_{ij} = \frac{\sum_k FRcc_{ijk} * BVPacimaCOA_{ijk}}{\sum_k BVPacimaCOA_{ijk}} \tag{7}$$

Calculate scan filter applied on the weighted property FRmedio:

$$filtroFR_{ij} = -\left(\frac{1}{frCorte}\right) * FRmedio_{ij} + 1 \tag{8}$$

Calculate the mobile HPHISO integrated along the column between kBase and kTop (along the k):

$$HPHISOm_{ij} = \sum_k H_{ij} * PHI_{ij} * SOm_{ij} \tag{9}$$

Product between filtroKH, filtroFR and HPHISOm, generating the Quality Map as Indicators of Poorly Drained Regions and Potential for Mesh Optimization, which is the invention itself:

$$HPHISOm_{ij}^{filtrado} = HPHISOm_{ij} * filtroFR_{ij} * filtroKH_{ij} \tag{10}$$

To exemplify the presented method, a synthetic flow model, called Pituba, was used. The same was worked with a drainage mesh with 8 producers and 7 injectors, and an edge injection concept (which would tend to maximize the recovery).

The model is composed of 85, 905 cells, between active and inactive, with only 23 layers, each of no more than 7 meters. The total VOIP of the model is 705.9 MM bbl (112, 23 MM $m^3$)) (776.5 MM BOE (4,751 MM kJ)), with medium viscosity oil (between 1.75 and 2.0 cp) and low solubility ratio (about 100 $m^3/m^3$). The field represented is also shallow, with original pressure at 305 kgf/$cm^2$ (29,910 MPa).

The basal concept of the original drainage mesh was to use 8 producers distributed along the structural high and 7 injectors positioned on the flanks, providing a peripheral injection. The mesh in question is represented in FIG. 14. The productive life period of the field is assumed to be a total of 27 years.

The application of the proposed method, as presented above, would have the ability to identify only regions with good potential for production and that were not explored with the current mesh, as shown in FIG. 18.

By means of FIG. 18, it is clear that the entire region more to the NE of the field is much better drained than the region more to the SW, although this is not so clear from the mobile HPHISO map. Thus, this region would emerge as a potential region for locating other wells (complementary projects, for example) and thus maximizing the recovery of the field. An exercise was carried out to increase the mesh for 11 producers, keeping the 7 original injectors in 2 different ways: (1) by the traditional method—HPHISO map after 27 years of production, and (2) applying the proposed methodology of the filters.

The first approach is shown in FIG. 16, with additional producers positioned and named "Palt1", "Palt2" and Palt3" from the traditional mobile HPHISO map. This mesh will be called weighted mesh 1 and has the 3 wells in question basically positioned in the region with the greatest original volume of oil in the field.

As illustrated in FIG. 17, the variation of the field production curve between the original mesh and the weighted mesh 1 generated an increase in FR of the order of 0.5% (18.8% to 19.3%), that is, 0.17% per well, which is an insignificant result given the mobile HPHISO not yet drained by the original mesh (FIG. 16).

By observing the filtered mobile HPHISO map (proposed methodology), however, there can be observed that other regions not highlighted in FIG. 16 appear as areas of greater potential for positioning new wells. From this map (FIG. 18), 3 more producing wells were allocated, called "Ptest1", "Ptest2" and "Ptest3". This mesh was called Weighted Mesh 2.

Contrary to the results of the weighted mesh 1, the recovery gains in the fields were very expressive, with the 3 wells in question guaranteeing an increase of 1.8% in FR in relation to the original (18.8% to 20.6%) and 1.3% in relation to the scope of weighted mesh 1 (19.3% to 20.6%). When compared to the weighted mesh 1, the result is even more expressive because, with the same investment, a result of +0.5% FR or +1.8% FR can be obtained, depending on the use of the post-processing methodology that is used. In terms of updated production, the additional 3 wells according to the proposed methodology generated an increase of 14%, or 8 MM bbl (1,272 MM $m^3$) updated.

The filtered HPHISO map of FIG. 19, indicating the quality of field drainage after the above-mentioned changes follows below. Note that, despite the mesh weighting, there are still regions of poorly drained oil, which would have the potential to still further increase the FR of the field. In any case, the evolution of the drainage quality of the field is noticeable, and, although the mobile HPHISO map indicates a large volume of mobile oil not yet drained, the proposed quality map indicates that the field drainage is efficient and there are few new optimization opportunities.

As indicated in the map in FIG. 20, the 3 wells are located in regions of greater mobile HPHISO, without, however, evaluating the drainage level of the regions of the deposit. See below the 3 new wells on the filtered mobile HPHISO map. The same clearly indicates that the scan in these positions was already very high, so their positioning in these locations should not bring gain in the recovery.

The perception is confirmed by means of the evaluation results of this new mesh, of 11 producers and 7 injectors, with the 3 additional wells positioned in these locations. Although the mesh weighting produces an anticipation of production, as in the Weighted Mesh 1 example, there is not the same gain in recovery as seen in the previous case. This was already expected because, as shown in the filtered map, the wells are at points where the HPHISO filtered after 27 years of production practically no longer indicates the presence of oil.

The following table summarizes the gains associated with increasing the scope with locations defined by the traditional method (mobile HPHISO) and the proposed method (filtered mobile HPHISO).

TABLE 1

Gains associated with different approaches.

| | FR | Updated Np |
|---|---|---|
| Original Mesh | 18.8% | 58 MM bbl (MM m$^3$) ) |
| Weighted Mesh 1 - Traditional Method | 19.3% (+0.5%) | 62 MM bbl (+4 MM) (9,857 MM m$^3$ (+0,636 MM m$^3$) ) |
| Weighted Mesh 2 - Proposed Method | 20.6% (+1.8%) | 66 MM bbl (+8 MM) (10,493 MM m$^3$ (+1,272 MM m$^3$) ) |

The invention claimed is:

1. A METHOD FOR THE HPHISO QUALITY MAP FILTERED BY TRANSMISSIBILITY, characterized in that it comprises following steps:
   a. performing scale cuts, and defining the top and bottom layers of the modeled reservoir,
   b. calculating the porous volume above the water-oil-contact (COA) using the equations $$BVPacimaCOA_{ij} = \begin{cases} 0, & Sw_{ijk}(t_i) > 0{,}90 \\ BLOCKVOL_{ijk}, & Sw_{ijk}(t_i) < 0{,}90 \end{cases}$$

$$BLOCKVOL_{ijk} = H_{ijk} * NTG_{ijk} * PHI_{ijk},$$

BVPacimaCOA corresponds to a porous volume of the reservoir cell above the COA, SW corresponds to water saturation, H corresponds to thickness of the reservoir cell, NTG corresponds to net-to-gross ratio of the reservoir cell, and PHI corresponds to porosity of the reservoir cell, and
   c. calculating the transmissibility applied in each cell of the model $KH_{ijk}=H_{ijk}*\sqrt{PERMI_{ijk}*PERMJ_{ijk}}*$, KH corresponds to a transmissibility of the reservoir cell, PERM corresponds to the permeability of the cell,
   d. applying transmissibility filter on each model cell $$filtroKHcc_{ijk} = \begin{cases} 1, & KH_{ijk} > khCorte \\ 0, & KH_{ijk} < khCorte \end{cases},$$

filtroKH$_{ijk}$ corresponds to a transmissibility filter in each model cell, and khCorte corresponds to a transmissibility cutoff threshold,
   e. calculating the weighted average of the transmissibility filter by the porous volume by means of the equation $$filtroHK_{ij} = \frac{\sum_k filtroKHcc_{ijk} * BVPacimaCOA_{ijk}}{\sum_k BVPacimaCOA_{ijk}}$$

applied to kBase and kTopo limits wherein kBase corresponds to an evaluated reservoir base layer and kTopo corresponds to a top layer of the evaluated reservoir;
   f. calculating the mobile HPHISO integrated along the column between kBase and kTop (along the k) by means of the equation $$HPHISOm_{ij} = \sum_k H_{ij} * PHI_{ij} * SOm_{ij}.$$

2. THE METHOD FOR THE HPHISO QUALITY MAP FILTERED BY TRANSMISSIBILITY according to claim 1, characterized in that, if the cell transmissibility is lower than a given limit, defined by the user, all the oil is zeroed for the filtered HPHISO map.

3. THE METHOD FOR THE HPHISO QUALITY MAP FILTERED BY TRANSMISSIBILITY according to claim 1, characterized in that the filter is applied to each cell of the grid.

4. THE METHOD FOR THE HPHISO QUALITY MAP FILTERED BY TRANSMISSIBILITY according to claim 3, wherein an average transmissibility filter value is determined along the reservoir defined by the user.

5. THE METHOD FOR THE HPHISO QUALITY MAP FILTERED BY TRANSMISSIBILITY according to claim 1, characterized in that the user is also responsible for defining a theoretical recovery factor (FRt) value where there is no fluid flow.

6. A METHOD FOR THE HPHISO QUALITY MAP FILTERED BY SCAN QUALITY, characterized in that it comprises the following steps:
   a. performing scale cuts, and defining the top and bottom layers of the modeled reservoir,
   b. calculating the porous volume above the water-oil-contact (COA) using the equations $$BVPacimaCOA_{ij} = \begin{cases} 0, & Sw_{ijk}(t_i) > 0{,}90 \\ BLOCKVOL_{ijk}, & Sw_{ijk}(t_i) < 0{,}90 \end{cases}$$

$$BLOCKVOL_{ijk} = H_{ijk} * NTG_{ijk} * PHI_{ijk},$$

BVPacimaCOA corresponds to a porous volume of the reservoir cell above the COA, SW corresponds to water saturation, H corresponds to thickness of the reservoir cell, NTG corresponds to net-to-gross ratio of the reservoir cell, and PHI corresponds to porosity of the reservoir cell, and
   c. calculating the recovery factory (FR) of each cell $$FRcc_{ijk} = \frac{So_{ijk}(ti) - So_{ijk}}{So_{ijk}(ti)},$$

SO corresponds to an oil saturation quantity,
   d. applying a weighted average in each cell by the pore volume calculated in step ii using the equation $$FRmedio_{ij} = \frac{\sum_k FRcc_{ijk} * BVPacimaCOA_{ijk}}{\sum_k BVPacimaCOA_{ijk}}$$

e. applying the scan quality filter on the FRmedio weighted property $$filtroFR_{ij} = -\left(\frac{1}{frCorte}\right) * FRmedio_{ij} + 1$$

f. generating the Quality Map by means of the product between filtroKH, filtroFR and HPHISOm $$HPHISOm_{ij}^{filtrado} = HPHISOm_{ij} * filtroFR_{ij} * filtroKH_{ij};$$

the filtroKH corresponds to an applied transmissibility filter, the filtroFR corresponds to a scan quality filter, and the HPHISOm corresponds to a mobile thickness, porosity, and oil saturation quantities.

7. THE METHOD FOR THE HPHISO QUALITY MAP FILTERED BY SCAN QUALITY according to claim 6, characterized in that it penalizes the regions that present a level of oil recovery above a certain economic cut-off value in the recovery, theoretical recovery factor theoretical FR, selected from a fractional flow (fw).

* * * * *